United States Patent [19]

Kincaid et al.

[11] 4,109,204

[45] Aug. 22, 1978

[54] APPARATUS AND METHOD FOR WIDEBAND COMMUNICATION WITH SUPPRESSION OF HARMONIC INTERFERENCE

[75] Inventors: Thomas G. Kincaid, Burnt Hills; Charles A. Stutt, Rexford, both of N.Y.

[73] Assignee: General Electric Company, Schenectady, N.Y.

[21] Appl. No.: 755,614

[22] Filed: Dec. 29, 1976

[51] Int. Cl.² .......................................... H04L 25/08
[52] U.S. Cl. ............................................. 325/38 R
[58] Field of Search ...................... 325/39, 40, 43, 44, 325/52, 141, 143, 164; 178/53, 68, 69.1; 340/167 R, 310 R, 310 A; 179/15 BL; 331/1 R, 19; 358/12, 13

[56] References Cited

U.S. PATENT DOCUMENTS

| | | | |
|---|---|---|---|
| 2,464,667 | 3/1949 | Boosman et al. | 325/141 |
| 2,698,896 | 1/1955 | Rinia | 325/143 |
| 3,162,857 | 12/1964 | Sanders | 325/39 |
| 3,440,353 | 4/1969 | Salmet | 325/39 |
| 3,745,361 | 7/1973 | Boyd et al. | 340/310 R |
| 4,037,248 | 7/1977 | Iijima et al. | 358/13 |

*Primary Examiner*—Benedict V. Safourek
*Attorney, Agent, or Firm*—Geoffrey H. Krauss; Joseph T. Cohen; Marvin Snyder

[57] ABSTRACT

A method for transmitting information with a desired bandwidth while suppressing interference due to harmonics of a system-wide signal, by transmitting each bit of information as a pair of spaced rectangular envelope modulation pulses having a time interval therebetween essentially equal to the reciprocal of the difference between the frequencies of a carrier and of adjacent harmonics of the undesired system-wide signal. A sequential plurality of double-pulse modulating waveforms can be transmitted for reception by a receiving means having a like plurality of demodulators each synchronized and sequentially enabled only when one of the pair of modulating pulses are present. A novel double-pulse demodulator means, capable of essentially rejecting undesirable harmonics in a system utilizing a data carrier modulated to be interlaced between sequential harmonics of a system-wide signal, and novel means for synchronous gating thereof, are disclosed.

21 Claims, 19 Drawing Figures

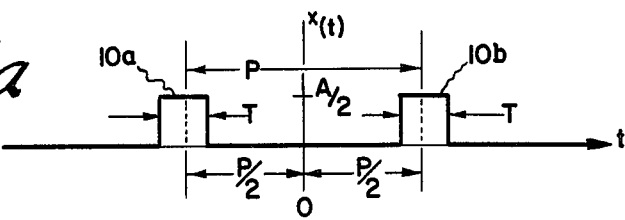
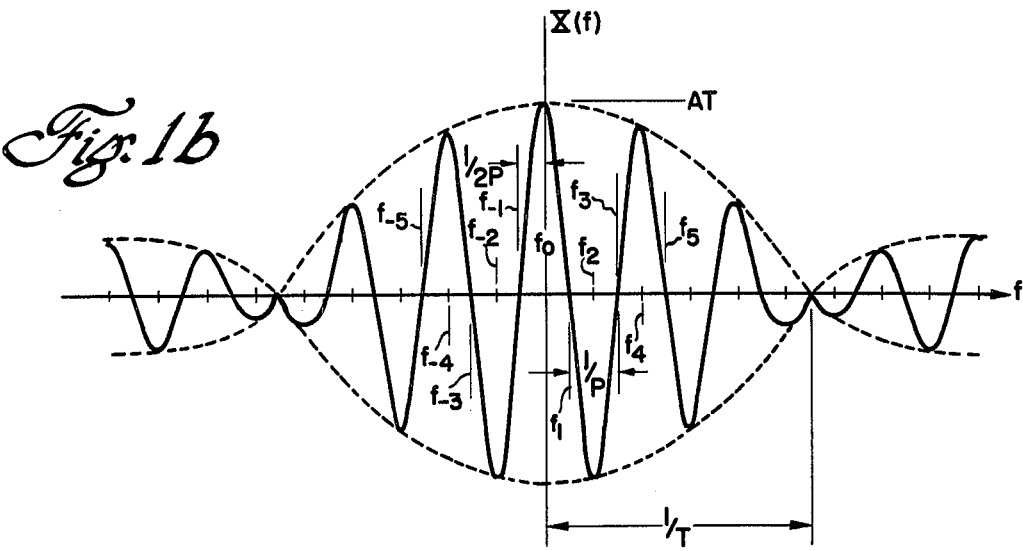
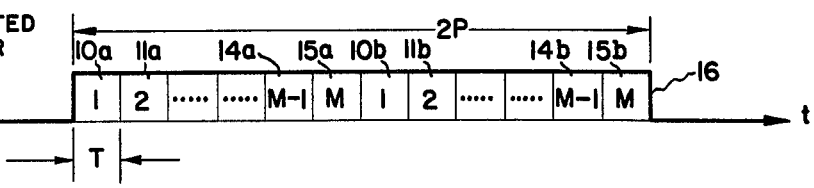
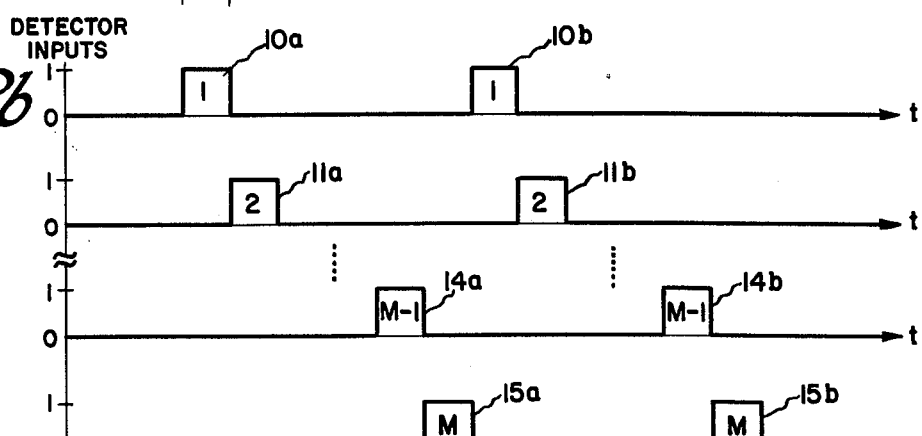
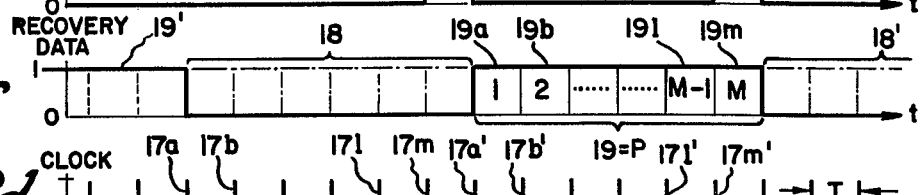

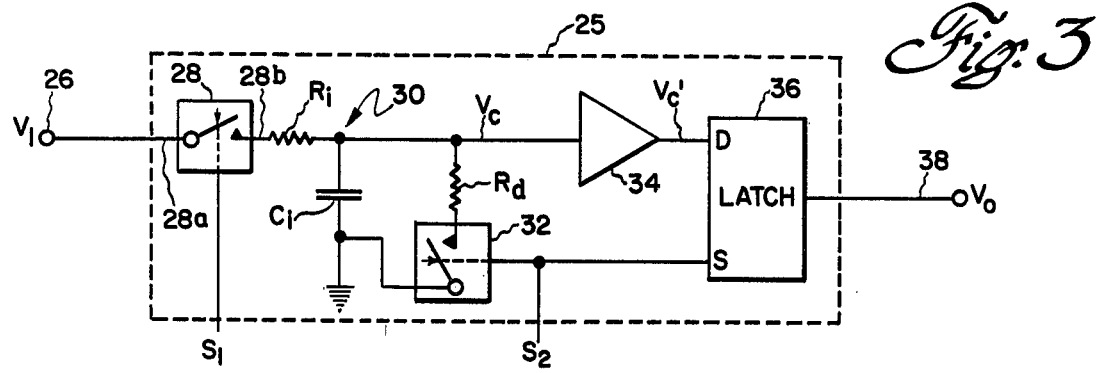
*Fig. 3*
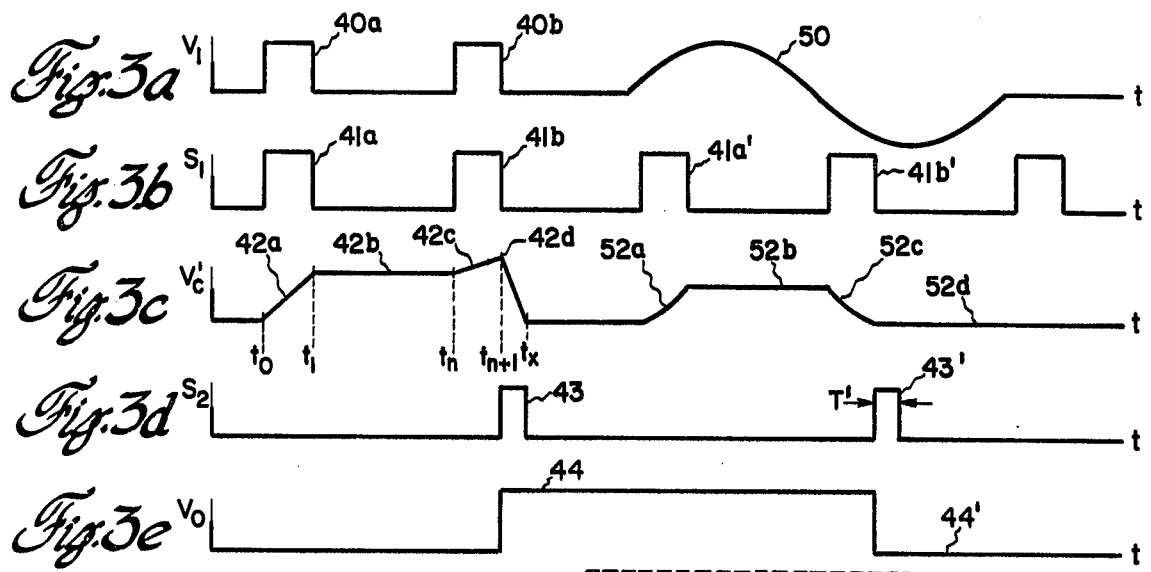
*Fig. 3a*
*Fig. 3b*
*Fig. 3c*
*Fig. 3d*
*Fig. 3e*
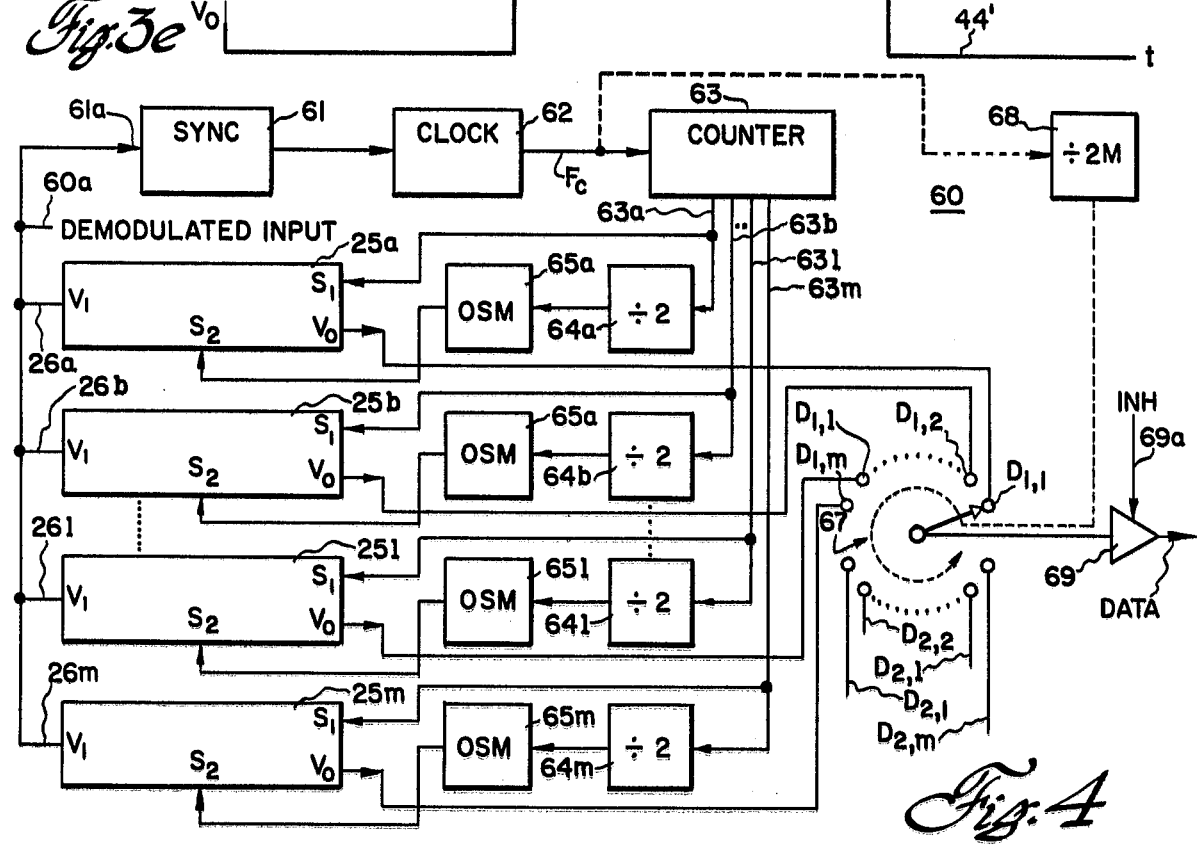
*Fig. 4*

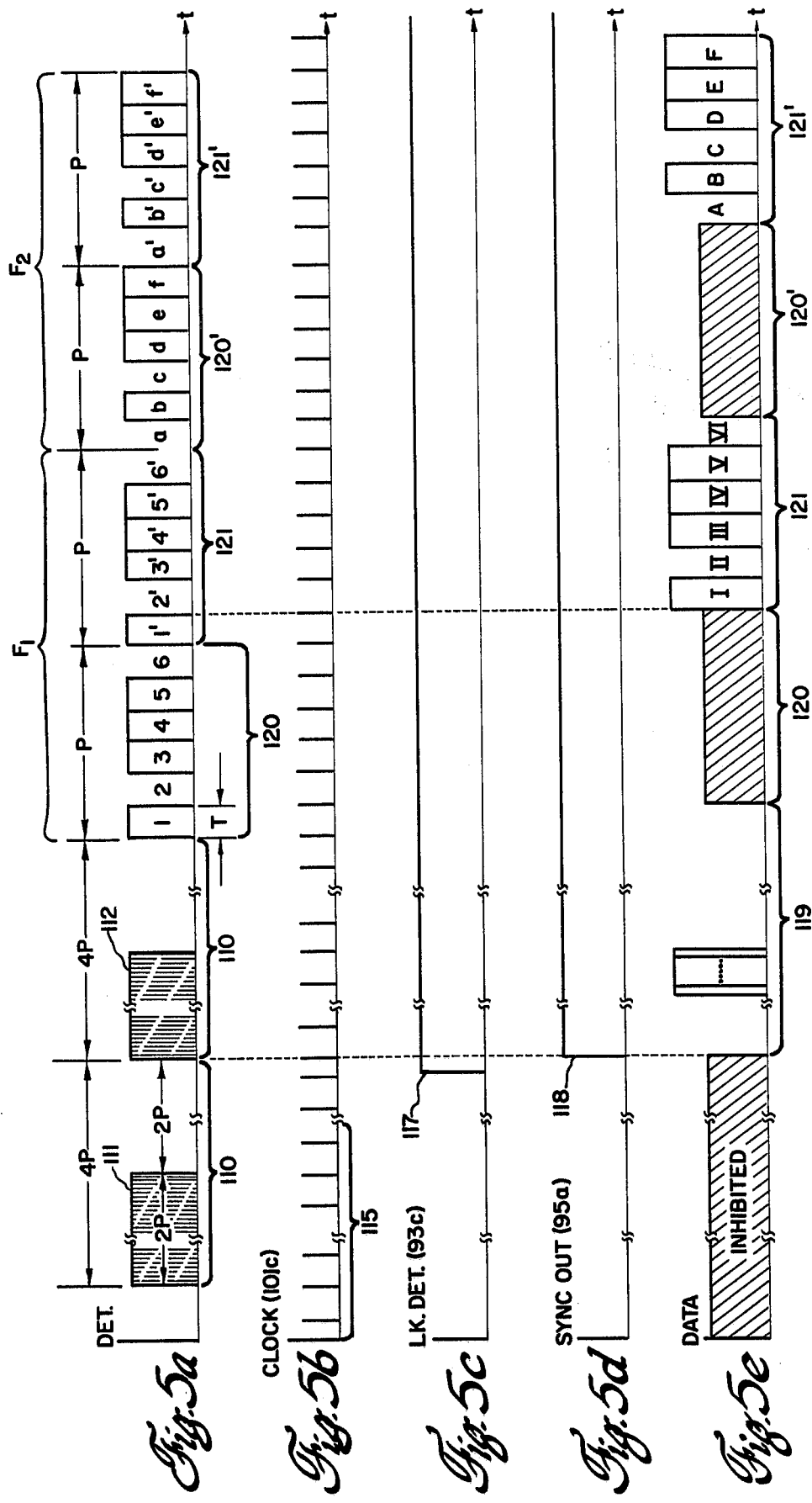

APPARATUS AND METHOD FOR WIDEBAND COMMUNICATION WITH SUPPRESSION OF HARMONIC INTERFERENCE

BACKGROUND OF THE INVENTION

The present invention relates to information transfer methods and apparatus and, more particularly, to a novel method for transmitting information at any desired bandwidth while suppressing interference from harmonics of a system-wide signal, and novel apparatus for practicing the method.

Data transmission systems are known for operation in a hostile environment having at least one potentially-interfering signal. The system disclosed in U.S. Pat. Nos. 3,944,723 (issued Mar. 16, 1976); 3,973,087 and 3,973,240 (both issued Aug. 3, 1976), all assigned to the assignee of the present invention, provides data communication utilizing a commercial power line as the transmission medium, wherein harmonics of the power transmission frequency (generally 60 Hz. in the United States) may appear within the passband assigned to a data carrier and interfere with the data transmitted thereon. The rate at which data may be transmitted has been generally restricted to relatively low rates in a system having harmonics of a system-wide signal. Several methods are known for increasing the data bandwidth, and hence the data rate; one such method comprises phase locking a data carrier at a frequency exactly between harmonics of a system-wide signal subject to frequency change and modulation of the data carrier at a baud equal to an exact submultiple of the frequency of the system-wide signal, as disclosed in pending U.S. application Ser. No. 722,551, filed Sept. 13, 1976 and assigned to the assignee of the present invention. This and similar techniques do not allow relatively wide bandwidth, and hence high data rate, to be achieved by data transmission using a single carrier (which single carrier technique does not require the additional equipment required for frequency multiplex transmission schemes). A method and apparatus using wide communication bandwidth in a single carrier system having a system-wide potentially interfering signal, and with suppression of harmonic interference therefrom, is desirable.

BRIEF SUMMARY OF THE INVENTION

In accordance with the invention, methods and apparatus for the transmission of information at any desired bandwidth while providing the capability to suppress interference of harmonics of a system-wide signal, comprise the modulation of a data carrier, having a frequency essentially interlaced midway between an adjacent pair of harmonics of the system-wide signal, with a waveform comprising a pair of like-polarity rectangular pulses for each bit of data to be transmitted. The spacing between the pair of pulses is established essentially equal to the reciprocal of the difference in frequency between the data carrier and either adjacent harmonic. The resulting frequency-domain waveform includes nulls essentially at the frequency of each harmonic, whereby the energy of the harmonic does not interfere with recovery of the desired data carrier modulation. Thus, the signal spectrum of the modulated data carrier is distributed in the frequency space between the harmonics of the system-wide signal. The width of each of the pulses of the pulse-pair is selected to provide a frequency domain modulation envelope whereby the potential interference effects of harmonics increasingly removed from the data carrier frequency is even further decreased.

In one preferred embodiment, the time interval between the pulses associated with a first bit of data is occupied by the first, or half-bit, pulse of similar pulse-pairs associated with subsequent bits of data. A receiving means contains a plurality of data detector means, equal in number to the number of sequential bits of data transmitted between the leading edge of the pulses of a pulse-pair. Synchronization means sequentially enable each of the data detector means only when a pulse is received associated with that one of the plurality of pulse-pairs assigned to the individual detector means. The gating of each data detector means causes rejection of essentially all harmonic interference by the odd-multiple frequency relationship established by data carrier interlace and pulse-pair spacing.

The incoming data transmission is preceded by a synchronization code. The means for synchronizing the plurality of data detectors utilizes a phase-lock-loop to acquire the synchronization code for resetting a counter means driven by an oscillator means which, in one preferred embodiment, is capable of being phase-locked to the system-wide signal. In the preferred embodiment, the oscillator means, and hence the synchronized detector means, is capable of being locked to any phase of a multiple-phase signal (such as found on a three-phase power line) to achieve adequate detector clock resolution even in the presence of shift in the phase of the system-wide signal.

Accordingly, it is one object of the present invention to provide a novel method for transmitting information at a high data rate in a system having a potentially-interfering, system-wide signal.

It is another object of the present invention to provide novel apparatus for facilitating the novel method of the present invention.

These and other objects of the present invention will become apparent upon consideration of the following detailed description and the associated drawings.

BRIEF DESCRIPTION OF THE DRAWINGS

FIGS. 1a and 1b are respectively time-domain and frequency-domain representations of a pulse-pair utilized for data transmission in accordance with the principles of the present invention;

FIGS. 2a, 2b, 2c and 2d are time-domain representations of a data frame having M pulse-pairs and of operations performed thereon to recover the M bits of data at a receiving means;

FIG. 3 is a schematic diagram of a detector means for use in detecting data transmitted by pulse-air modulation;

FIGS. 3a-3e are waveforms associated with the data detector means of FIG. 3;

FIG. 4 is a schematic block diagram of a portion of a receiver utilizing the detector means of FIG. 3 with multiple pulse-pair carrier modulation;

FIGS 5a-5e are graphical illustrations of waveforms associated with the operation of a receiver incorporating the data detectors of FIG. 4 and the synchronization means of FIG. 5.

DETAILED DESCRIPTION OF THE INVENTION

Figure 5:
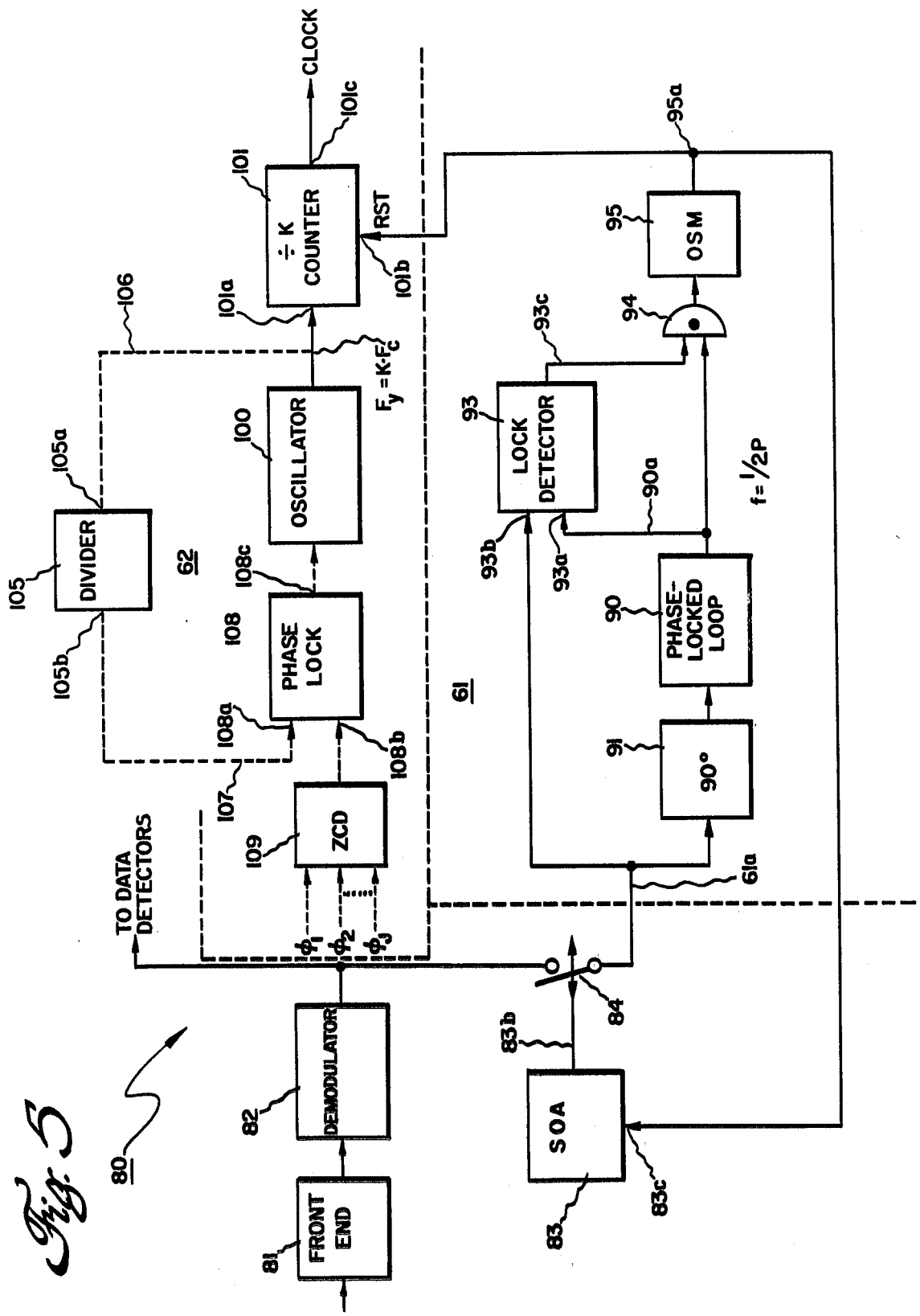
FIG. 5 is a schematic block diagram of means for synchronizing the detectors of FIG. 4.

Referring initially to FIGS. 1a and 1b, a data transmission system utilizes a data carrier at a frequency $f_0$, interlaced essentially midway between adjacent harmonics of a system-wide signal $f_S$, i.e. $f_0=(k+1/2)f_S$, where k is an integer. The harmonics immediately above and below the data carrier have frequencies respectively designated as $f_1$ and $f_{-1}$. Additional harmonics above the data carrier frequency at frequencies $f_3$, $f_5$, . . . , $f_{2n+1}$, while additional harmonics below the data carrier frequency are at frequencies $f_{-3}$, $f_{-5}$, . . . , $f_{-(2n+1)}$, where n is a positive integer. The frequency spacing $(\Delta f)$ between the data carrier and adjacent harmonics is thus equal to an odd-multiple of half the frequency of the system-side signal, i.e. $\Delta f=(2n+1)\cdot(f_S/2)$. Illustratively, in a data transmission system utilizing commercial power lines as the transmission media, the frequency spacing between two successive harmonics is the frequency (approximately 60 Hz.) of the A.C. current carried by the system. The data carrier will have a frequency $f_0$ approximately 30 Hz. below and above, respectively, the next-highest and next-lowest power-frequency harmonics. Thus, if the 150-th harmonic, e.g. 9000 Hz., is chosen as the next-lowest harmonic at frequency $f_{-1}$, the data carrier has a frequency of 9030 Hz. and the next-highest harmonic has a frequency $f_1$ of 9060 Hz..

The data carrier is modulated (FIG. 1a) with a time-domain waveform X(t) comprising a pair of pulses 10a and 10b, each pulse having like polarity, a pulse duration of T seconds, a normalized amplitude A/2 and a pulse-to-pulse spacing of P seconds. The frequency-domain waveform X(f) due to this modulation envelope is equal to $AT((\sin\pi Tf)/(\pi Tf))\cos 2\pi f(P/2)$. The modulated data carrier frequency spectrum (FIG. 1b) is essentially $X(f-f_0)$, or the spectrum X(f) due to the pulse-pair modulation waveform shifted in frequency to be centered about the data carrier frequency $f_0$.

Thus, in the frequency domain, the modulated data carrier has a maximum signal component of amplitude AT, at the data carrier frequency $f_0$, and has a first null at a frequency $\Delta f=1/(2P)$ Hz. from the data carrier frequency. Similar modulation envelope nulls are found at multiples of this difference frequency, i.e. $\Delta f_n=(2n+1)/(2P)$. As previously stated, the frequency spacing between the data carrier and adjacent harmonics is equal to an odd-multiple of half the frequency of a system-wide signal, i.e. $\Delta f=(2n+1)\cdot(f_S/2)$, whereby equating the difference frequencies to position modulation envelope nulls at the harmonic frequencies (assuring minimization of interference therebetween) yields the constraint that the pulse time spacing P be essentially equal to the reciprocal of the frequency of the system-wide signal, i.e. $P=1/f_S$. Thus, by establishing the spacing between the pulses of the pulse-pair to be equal to the time interval required for one cycle of the potentially-interfering system-wide signal, interference between harmonics of that system-wide signal and the modulation envelope is minimized. It should be understood that this synchronization can be easily accomplished at a transmitting end by detecting a suitable event, such as the zero crossings and the like, of the system-wide signal for synchronizing a time-interval-determining means forming part of the means generating the pulse-pair modulation envelope. It should be further understood that, by controlling the time interval between pulses, data must be transmitted by varying another characteristic of the modulating pulse-pair waveform; the data may be transmitted by amplitude modulation techniques (varying the amplitude of both pulses of the pair equally), by polarity-reversal techniques (varying the polarity of both pulses of the pair), or by phase-modulation techniques (varying the phase of the data carrier by equal amounts of polarities during each of the pulses of the pair), or similar techniques. For purposes of illustration, a relatively simple on-off keying (OOK) modulation technique will be utilized herein, whereby binary information is transmitted as a binary "one" if both pulses 10a and 10b are present with a non-zero amplitude, and a binary "zero" bit is transmitted if both pulses 10a and 10b are present with a zero amplitude. It should be understood that binary data may be transmitted equally as well, even in the OOK mode, by utilization of each of two different non-zero pulse-pair amplitudes to represent each of the two binary levels.

The time duration T of each pulse 10a and 10b may be any selected time duration less than one-half the time interval between pulses of the pair, i.e. T<P/2. Preferably, the pulse width T is established to be an integer submultiple (1/M) of the pulse-to-pulse time interval, i.e. MT=P. The frequency-domain modulation waveform will thus have an envelope responsive to the $(\sin\pi Tf)/(\pi Tf)$ term, which will have a null at a frequency $f=1/T$ removed from the data carrier frequency $f_0$ and will coincide with the n-th harmonics above and below the data carrier frequency (to further suppress the potentially-interfering energy content of these harmonics) if $T=2P/n$.

Referring now to FIG. 2a, if the pulse time interval T is is equal to the M-th submultiple of the pulse-pair time interval P, an additional (M-1) pulses of equal time duration T may be transmitted between the first and second pulses 10a and 10b, respectively, associated with a single bit of information. The second pulses for the additional (M−1) pulse-pairs now sequentially follow the second pulse 10b, whereby a frame 16 of information, of duration 2P, may be utilized to transmit M bits of data in the same 2P time interval previously required for transmission of a single bit of data by a single pulse-pair of FIG. 1a. Thus, the first pulses, 10a, 11a, . . . , 14a, 15a, respectively, of the pulse-pairs for bits 1, 2, . . . , M−1, M are sequentially followed by the respective second pulses 10b, 11b, . . . , 14b, 15b, respectively, to transmit a frame 16 of a time duration 2P and made up of 2M ordered pulses, each pulse being $T(=P/M)$ seconds wide. The time-multiplexed frame (FIG. 2a) is resolved (FIGS. 2b-2d) into its M bits of data at a receiving end by sequentially enabling (FIG. 2b) the input of each of M detector means only when each of the pulses of a like-ordered pulse pair arrive at the receiving end. A clock (FIG. 2d), previously synchronized to a clock frequency $f_c$ equal to the reciprocal of pulse duration $T_1$ provides a train of clock pulses 17 to sequentially enable each of the M detector means at the start of the appropriate pulse intervals of frame 16. Thus, a first clock pulse 17 occurs coincident with the leading edge of the first pulse 10a of the first data pulse-pair 10, while successive pulses 17b, . . . , 17l, 17m occur at the leading edges of the first pulse of each pulse-pair associated with the second, . . . , (m-1)-th, m-th information bits of the frame; the next sequence of clock pulses 17a'. 17b' . . ., 17l', 17m' occur at the leading edges of the M second pulses 10b, 11b, . . . 14b, 15b of the pulse-pairs in frame 16. Successful detection of a data bit requires the presence of both pulses, e.g. 10a and 10b to recover the data of bit 1 (FIG. 2c), whereby a single pulse due to noise, harmonic energy and the like disturbances in the systems is not detected as a bit of data. Thus, there is no recovered data detected in interval 18, during which the first pulse of each of the M data bits is transmitted. Only upon receipt of the second pulse of the pair, e.g. pulse 10b of the first pulse pair 10a and 10b, can the recovered bit of data, e.g. first bit 19a, be present at an output. Similarly, the second, . . . , M-1-th, M-th bits of recovered data, respectively, can only be present at a receiver output during or after the receipt of the corresponding second pulses of the pulse-pair, e.g. second pulses 11b, . . . , 14b, 15b, respectively. It will thus be seen that data is present only during the latter half time interval 19, of duration P, of a frame, with the initial half frame 18, also of duration P, causing no data output and normally requiring output signal repression to prevent random noise appearing thereat as recovered data. The initial half-frame-interval 18, 18', . . . , respectively, preceding each valid-data latter-half-frame time interval 19, 19', . . . , respectively, may be utilized to transmit alternating data frames via a two-frequency multiplex arrangement to create a continuous data stream from a receiver means data detector. The two frequencies, if utilized, preferably have a frequency spacing equal to a high integer multiplex of the (1/T) null frequency, whereby the modulation envelope of each carrier has decreased to relatively low amplitudes prior to extending into the frequency space occupied by the modulation waveform associated with the other data carrier, in accordance with the decaying frequency-domain envelope illustrated in FIG. 1b.

Referring now to FIG. 3, a preferred embodiment of a detector means 25 is shown for recovering the value of a data bit encoded as a pair of pulses, each T seconds wide and spaced P seconds apart, received at an input 26. A first normally-open switch means 28 is adapted for closure only during the presence of a first switching signal $S_1$. The switch input terminal 28a is coupled to detector input 26; the switch output terminal 28b is coupled to the input of an integrating means 30 comprised of a series-connected integrating resistor $R_i$ and an integrating capacitor $C_i$. A discharge resistor $R_d$ is coupled across integrating capacitor $C_i$ upon closure of a second normally-open switch means 32, responsive solely to the presence of a second switching signal $S_2$. The integrator output voltage $V_c$, coupled from the junction between integrator resistor $R_i$ and integrator capacitor $C_i$, is buffered by amplifier means 34 to appear as a data voltage $V_c'$ at the data input D of a latch means 36. A strobe input S of latch means 36 receives the second switching waveform $S_2$ to enable storage of data voltage $V_c'$ responsive thereto. The stored data voltage is presented as a detector output voltage $V_0$ at detector output 38, and maintained until receipt of a next-subsequent second switching signal $S_2$ when the value of the data voltage then present at data input D is then stored in latch means 36.

In normal operation, the input signal voltage $V_1$ contains the desired pulse pair 40a and 40b (FIG. 3a). The first switching signal (FIG. 3b) comprises a pair of pulses 41a and 41b previously synchronized to each appear coincident with, and of equal time duration as, each associated input pulse 40a and 40b, respectively. The first pulse 41a of the first switching signal causes first switch means 28 to close, coupling first input voltage pulse 40a to integrator means 30. The substantially rectangular first pulse (herein illustrated as being of positive polarity) is integrated; the buffered data voltage signal $V_c'$ (FIG. 3c) appears as a ramp-like voltage 42a increasing from the start ($t_o$) of the first pulse 40a until the end ($t_1$) of that pulse. The second switching signal $S_2$ is initially maintained at zero, whereby switch means 32 remains open and, if the input impedance of buffer amplifier means 34 is relatively high, the integrating capacitor $C_i$ is not discharged, so that data voltage $V_c'$ is maintained at the value 42b achieved at the time ($t_1$) at which switch $S_1$ opens. Subsequently, the first switch means 28 is again activated by the second pulse 41b of first switching signal $S_1$, coincident with the arrival of second pulse 40b of the pulse-pair modulation input. Upon second closure of switch means 28, at time $t_n$, integrator means 30 integrates the voltage present during second pulse 40b to further increase the data voltage as another ramp-like signal 42c, further extending above the intermediate value thereof 42b. The final value 42d of the integrated pulse-pair waveform is twice the value, at 42b, achieved by integration of either single pulse 40a or 40b, and is present at the data input D of latch means 36 after switch means 28 has opened for the second time. Thus, the second switching signal $S_2$ may appear at any time after the second falling edge of the first switching signal (at time $t_{n+1}$) and cause latch means 36 to store that value. Preferably, the second switching signal (FIG. 3d) appears immediately after the cessation of the second pulse 41b of the first switching signal, whereby latch means 36 advantageously utilizes a leading-edge strobe input S to store the value of buffered data signal $V_c'$ at that instant of time as the detector means output voltage $V_o$ (FIG. 3e) and maintain the same until the next leading edge of the second switching signal $S_2$ appears.

In the case of energy received from potentially-interfering harmonics of the system-wide signal, the harmonics have a spacing of 1/P Hz. whereby the waveform 50 is sampled and integrated (FIGS. 3a and 3b) by synchronized first switching signal pulses 41a' and 41b', respectively, over portions of the interfering waveform having similar amplitudes but of opposite polarity; the resulting data voltage is an integrated-to-zero output. Thus, first sampling signal pulse 41a' samples harmonic waveform 50 during the positive rising portion thereof to produce a first portion 52a of data voltage (FIG. 3c), which portion has a non-linearly increasing characteristic. The integrator output remains at a fixed level 52b after switch means 28a is opened by the cessation of first sampling pulse 41a'. The second pulse 41b' of the first switch signal $S_1$ samples the sinusoid for the same time interval, but at a point exactly one-half cycle later whereby the same waveshape, but of opposite polarity, is integrated to form a non-linearly decreasing data voltage portion 52c reducing the voltage at latch data input D essentially to zero at the appearance of second switching signal 43' (FIG. 3d). Upon appearance of second switching signal 43', and prior to the discharge of integrating capacitor $C_i$ via discharge resistor $R_d$, latch means 36 is strobed to capture the essentially zero output voltage level 44', responsive to the essentially zero integrated voltage 52d. Thus, when a harmonic waveform is present even with the desired modulation pulse-pair 40a and 40b, the contribution of the harmonic waveform 50, by superposition, is averaged to zero and the detected value of the modulation pulse-pair is substantially the only signal appearinng at output 38.

Referring now to FIG. 4, a portion 60 of a receiver means for detecting M-bit data signal transmitted during a frame interval, comprises a plurality M of detector means 25a, 25b, ..., 25l, 25m, each having its respective input 26a, 26b, ..., 26l, 26m, connected in parallel to a demodulated input terminal 60a at which the detected modulation envelope of a modulated carrier is presented. The demodulated input source is also present at the input 61a of a synchronizing means 61 which serves to adjust the frequency $F_c$ of a clock means 62 to be exactly $F_c = M/P = 1/T$. The synchronized clock means drives a one-of-M counter means 63, such as a Johnson counter and the like, having each of its M ordered outputs 63a, 63b, ..., 63l, 63m sequentially enabled for a time interval of T seconds. Each ordered output of the counter is coupled to a first switching signal input $S_1$ of a like-ordered detector means, e.g. first counter means output 63a is coupled to the first switching signal input $S_1$ of the first detector means 25a, second output 63b is coupled to the first switching signal input of second detector means 25b, and so forth.

Each ordered counter means output 63 is also coupled to the input of an ordered one of a like plurality M of divide-by-two means 64a, 64b, ... 64l, 64m; the output of each divide-by-two means 64 triggers the input of an associated one shot multivibrator (OSM) means 65a, 65b, ..., 65l, 65m to each produce the second switching signal pulse 43 of time duration T' for coupling to the second switch signal input $S_2$ of the associated detector means 25 upon the occurrence of a falling edge of every other first switching signal pulse. Thus, once synchronized, counter means 63, the ordered set of divide-by-two means 64 and the associated order set of OSM means 65 provide the required first and second switch signals to the paralleled bank of M data detector means, whereby M latched, sequential output voltage $V_0$ are recovered and present during the latter half of a data transmission frame.

A switch means 67 has each of a plurality of stationary contacts $D_{1,1}$, $D_{1,2}$, ..., $D_{1,l}$, $D_{1,m}$ coupled to the voltage output $V_0$ of the associated ordered data detector means 25. A commutating contact 67a, under the control of a divide-by-2M means 68, is caused to sequentially step through contact with each data contact $D_{1,1}$ to $D_{1,m}$ for sequentially coupling each data detector output through a data buffer means 69 to recover the sequential half-frame data sequence 19 (FIG. 2c). It should be understood that an additional plurality M of stationary contacts, e.g. $D_{2,1}$, $D_{2,2}$, ..., $D_{2,l}$, $D_{2,m}$ can be added to switch means 67 to present to buffer means 69 the sequentially ordered output voltages of a second, similar set of data detector means receiving their input from demodulation means operating upon a second, frequency-multiplexed data carrier to provide sequential data values during the initial half-frame interval 18 (FIG. 2c) during which new data is not provided by the first plurality M of data detector means operating on the demodulated carrier of a first channel. The data rate for a single data carrier transmission system is M/2P bits per second, while the data rate for a two channel, frequency multiplexed transmission system is exactly double that of a single channel system, i.e. is M/P bits per second. Thus, a single channel system having $M = 6$ and utilizing a commercial power line system for its transmission media, with 60 Hz. harmonics present throughout the system, has a data rate of $6 \times 60/2$, or 180, bits per second, while a two-channel, frequency-multiplexed system using the same parameters has a data rate of 360 bits per second.

It should be understood that commutator switch means 67 may be any known electromechanical or electronic, M—, or 2M—, input-to-one-output multiplexing means.

Referring now to FIG. 5, the remaining portions of a receiver 80, exclusive of that portion 60 containing the plurality of data detector means, includes front end means 81 for receiving the double-pulse modulated frames of the data carrier frequency from the transmission media, such as the power line and the like, and providing suitable carrier frequency amplification and frequency conversion as required. The output of front end means 81 is coupled to a demodulator means 82 for recovering the pulse pair, or the interlaced M sequential pulse-pairs of the modulation waveform from the modulated data carrier. As previously mentioned hereinabove, the output of demodulator means 82 is fed in parallel to the inputs 26 of data detector means 25 and to the input 61a of synchronization means 61.

The initial portion of a message contains synchronization waveforms for causing synchronizing means 61 to act on clock means 62 to produce a properly timed clock signal for operation of the M data detector means 25. SOA means 83 normally energizes an output 83b to close a switch means 84, applying the demodulator means output to synchronizing means input 61a. The synchronizing waveform is applied to a phase-locked-loop means 90, through a 90° phase shift means 91 to compensate for the 90° phase shift of loop means 90. The output of loop means 90 is brought into synchronization with the modulation waveform having the desired frequency and phase of a remote clock at a transmitter end. Loop means output 90a is coupled to a first input 93a of a lock detector means 93 having its remaining input 93b coupled to synchronizing means input 61a. The lock detector means output 93c is enabled only when the frequency and phase of the signal at the loop means output 90a is the same as that of the demodulated synchronization signal. Lock detector means output 93c and loop means output 90a form the inputs of a two-input AND gate means 94 which triggers a one shot multivibrator (OSM) means 95 to generate a relatively long time constant (longer than the expected time interval of the data transmission) signal at the output 95a thereof. The OSM means output is returned to an input 83c of the SOA means to cause switch means 84 to open, whereby, once synchronized, additional data patterns having characteristics similar to the synchronization pattern will not cause synchronization means 61 to attempt to resynchronize to an invalid synchronization code. The phase-lock-loop means 90 acts as a filter, during the synchronization time interval, to reduce the distortion of the demodulated waveform caused by channel noise, further facilitating proper synchronization. After the OSM means time interval is completed, the SOA means input 83c is de-energized and switch means 84 returns to its normally closed condition whereby synchronization means 61 can be re-synchronized by transmission of the proper signal (for start-of-acquisition) including by the correct synchronization code.

Clock means 62 comprises an oscillator means 100 having an output frequency $F_y$ which is a high integer multiple K of the clock frequency required by the one-of-M counter means 63, i.e., $F_y = K \cdot F_c$. The output of oscillator means 100 is applied to the clock input 101a of a divide-by-K counter means 101, which also has a reset (RST) input 101b for setting the output 101c thereof to zero upon receipt of the leading edge of the OSM output 95a waveform at input 101b. After reset, counter means 101 commences to produce one clock pulse for each K sequential cycles of the input applied thereto. By constraining the oscillator means 100 to operate at a high integer multiple K of the required clock frequency, the time resolution attainable at clock output 101c is one-in-K parts per clock interval (T), assuring high resolution.

A high degree of resolution must be coupled with a high degree of oscillator means stability. While oscillator means 100 may be a temperature-compensated crystal oscillator, it is preferable that oscillator means 100 be the oscillator portion of a phase lock loop, including frequency divider means 105, receiving its input 105a (by connection 106 shown in broken line) from the output of oscillator means 100 and having its output 105b coupled (via connection 107 also shown in broken line) to one input 108a of a phase lock means 108 having a reference signal applied to its remaining input 108b for generating a correction signal at the output 108c thereof for frequency correction of oscillator means 100, in known manner. Advantageously, in a system utilizing commercial power means for the data transmission media, the reference signal at phase lock means 108b may be obtained by sensing appropriate characteristics, such as the zero crossings, of the line frequency. Thus, a zero crossing detector (ZCD) means 109 may be coupled to the line to generate the reference signal at input 108b. Of particular advantage, when a power line having a multiplicity J of phases is utilized, (such as the prevalent three-phase, e.g. $J = 3$, commercial power lines), each of the J phases, e.g. $\phi_1, \phi_2, \ldots, \phi_J$ is applied to ZCD means 109 to generate an output having a total of $2J \cdot f_S$ crossings per second, or 180/J degrees between consecutive zero crossings. If K is selected to be a sufficiently high integer, then each clock pulse may be resolved to within $1/(2JK)$-th of a cycle of the system-wide signal. Illustratively, if $J = 3$, each clock pulse at output 101c is of about 2.78 milliseconds duration and is resolved to within $\pm 1/K$ of its duration, e.g. about $\pm 86.8$ μ seconds, with $K = 32$. Thus, a high-resolution, high-accuracy clock signal can lock the received data to any phase of the multi-phase line to assure detector sampling at essentially the same portion of opposite polarity half-cycles of the harmonics of the system-wide signal for effective cancellation.

Referring now to FIGS. 5a-5e, the operation of receiver 80 (including synchronizing means 61, clock means 62) and of data detector means 25 (of order $M = 6$), is illustrated for reception of a data communication having a detected modulation envelope (FIG. 5a) at the output of demodulator means 82. The detected modulation message commences with a plurality of double-frame-length synchronizing code blocks 110, each comprising, for example, an initial-half, full-frame interval 111 (with time duration 2P) of a first modulation, e.g. binary one, condition and a latter-half, full-frame interval 112, also of time duration 2P, of another, e.g. binary zero, modulation condition. The synchronization double-frame intervals 110 are followed by at least one frame of interlaced, double-pulse-coded data, e.g. the two data frames $F_1$ and $F_2$.

Prior to synchronization, the clock pulses at output 101c (FIG. 5) may not be locked to either the bit or frame frequencies, as during time interval 115 (FIG. 5b).

The outputs 93c and 95a of respective lock detector means 93 and OSM means 95 are respectively at their deenergized levels (FIGS. 5c and 5b, respectively) and the detector data buffer inhibit input 68a is enabled (FIG. 5c) to prevent channel noise from appearing as bits of information thereat.

During one of synchronization intervals 110, phase lock loop means 90 locks to the frame frequency, i.e. $f = 1/(2P)$, at the beginning of time interval 117 (FIG. 5c). Upon achieving frame synchronization, lock detector means output 93c is enabled. At the next positive transition of the synchronizing waveform, both inputs to AND gate 94 are positive whereby the output of OSM means 95 is enabled to a binary one level 118 (FIG. 5b). The leading edge 118a of waveform 118 appears at RST input 101b of counter means 101 to reset the output 101c thereof and to cause clock pulses to appear at that output for every K cycles thereafter from oscillator means 100. The clock pulses at output 101c are now synchronized with each bit of the synchronization code in the subsequent message frames. Once synchronized, the data detectors output M sequential binary ones during the latter-half time interval of each first-frame portion 111 of a synchronization double-frame 110 and output M sequential binary zeroes during the latter-half of the second frame portion 112, as indicated in region 119 (FIG. 5e). Thus, immediately prior to the start of the first message frame $F_1$, the clock output has assumed the proper frequency, look detector output 93c and synch output 95a are both energized and the output of data buffer means 68 is a binary zero.

During the initial half of the first data frame $F_1$, the $M = 6$ first pulses, e.g. pulses 1–6, are sequentially gated to the inputs of the ordered array of M detector means. (Note the time scale expansion beginning at the start of frame intervals 120–121'.) The data output of the detector means, during the initial-half-frame time interval 120, may be inhibited, as shown by the shaded portion of FIG. 5e, or may be, as previously mentioned, the latter-half-frame data output from a second frequency multiplexed channel. During the latter-half-frame time interval 121 of the first frame, the second pulse, e.g. pulses 1'–6', of each pulse-pair is sequentially received and sequentially detected by the six detector means 25 to recover the associated binary data values, e.g. output bits I–VI. Similarly, during the initial-half-frame time interval 120' of second frame $F_2$, the data output (FIG. 5e) is inhibited during integration of the first pulse, e.g. bits a–f, of each of the M pulse-pairs; receipt of modulation bits, e.g. bits a'–f', during the latter-half-frame time interval 121' of the second frame cause the recovered second frame data bits, e.g. A–F, to appear at the data output.

At some point in time after receipt of the last data bit, e.g. bit F, of the message, OSM means 95 times out to cause output 95a to return to a binary zero level to cause switch means 84 to re-close and prepare the receiving means for receipt of a subsequent message preceded by its multiplicity of synchronization code periods 110.

While the present invention has been described with reference to various embodiments thereof, many variations and modifications will become apparent to those skilled in the art. It is our intent, therefore, to be limited not by the scope of the disclosure herein but only by the scope of the appending claims.

What is claimed is:

1. A method for transmitting information with a desired bandwidth while suppressing interference thereto from harmonics of a system-wide signal, comprising the steps of:

(a) providing a data carrier having a frequency essentially midway between an adjacent pair of harmonics of the system-wide signal;

(b) transforming each of a plurality of bits of the information into a signal comprising a pair of like-polarity pulses, each pulse having a time duration T;

(c) setting a time interval P between the pair of pulses to be essentially equal to twice the reciprocal of the frequency difference between the frequency of the data carrier and the frequency of the adjacent harmonics of the system-wide signal;

(d) modulating one of the parameters of the data carrier with the pulse-pair signal to be transmitted;

(e) transmitting the modulated data carrier to a receiving end; and (f) detecting the pulse-pair signal to recover at the receiving end each bit of data therein.

2. A method as set forth in claim 1, wherein each of the pair of pulses is a rectangular pulse.

3. A method as set forth in claim 1, wherein step (b) includes the step of setting the time duration T of each pulse to be essentially equal to the inverse of a selected integer multiple of the frequency difference between the frequency of the data carrier and the frequency of each of the adjacent harmonics of the system-wide signal.

4. A method as set forth in claim 1, wherein step (d) includes the step of varying the amplitude of both pulses of the pair equally in accordance with the value of each bit of information.

5. A method as set forth in claim 1, wherein step (d) includes the step of varying the phase of the data carrier by equal amounts and polarities during each of the pulses of the pair in accordance with the value of each bit of information.

6. A method as set forth in claim 1, wherein information is transmitted in binary form and step (d) includes the step of varying the polarity of both pulses of the pair in accordance with a binary value of each information bit.

7. A method as set forth in claim 1, further comprising the steps of: sequentially arranging an integral number M of bits of data for sequential transmission as a frame of modulation on said data carrier, each bit of data being transformed to one of said signals comprising a pair of spaced pulses; sequentially transmitting the first pulse associated with each of the M sequential data bits prior to sequentially transmitting the second pulse associated with each of the M data bits; and generating each of the pulses with a time duration T essentially equal to the quotient of the time interval P between first and second pulses of a pair and the number of bits to be sequentially transmitted in the associated frame.

8. A method as set forth in claim 7, further comprising the steps of providing the receiving end with a plurality M of data detector means, equal in number to the number M of information bits transmitted in a frame; and sequentially enabling each of the data detector means to receive each pulse of only that one of the plurality M of pulse-pairs assigned to an individual one of said plurality of detector means to decode each sequential bit of the modulation on said data carrier.

9. A method as set forth in claim 8, further comprising the steps of:

transmitting a synchronization code prior to the at least one information frame of a message;

acquiring the synchronization code at said receiving end; and synchronizing the enablement of each of said plurality of data detector means responsive to receipt of said synchronization code.

10. A method as set forth in claim 9, wherein said systemwide signal is of a multi-phase nature, and further comprising the step of synchronizing said plurality of detector means both to said synchronization code and to a selected phase of the multiple-phase system-wide signal, whereby the modualtion of the data carrier is detected even in the presence of shift of the phase of the system-wide signal.

11. Apparatus for receiving information transmitted as a plurality of bits of information, each bit modulating a data carrier having a carrier frequency essentially interlaced midway between a pair of adjacent harmonics of a system-wide signal, with a pair of like-polarity signal pulses having a pulse duration T and a time interval P between pulses, comprising:

means for receiving the modulated data carrier;

demodulator means for recovering the pulse-pair modulation signal from the modulated data carrier;

detector means receiving the pulse-pair modulated signal for recovering the value of the bit of information responsive to both pulses of a modulation signal, said detector means comprising input means for receiving the pulse-pair modulation signal;

first means for integrating the amplitude of said signal;

first switch means for coupling said signal to said first means responsive to said first switching signal present essentially only when one of said pair of pulses should be present at said input means;

second means for storing the amplitude of the integrated signal responsive to a second switching signal present only after every other occurrence of said first switching signal; and output means at which the amplitude stored in said second means appears as the recovered value of the associated bit of information; and means for synchronizing said detector means to operate only when each of said pair of pulses of a modulation signal is present.

12. Apparatus as set forth in claim 1, wherein said detector means further comprises second switch means operable responsive to said second switching signal to return said first means to a preselected set of initial conditions.

13. Apparatus as set forth in claim 12, further comprising means receiving said first switching signal for generating an output responsive to the cessation of every other occurrence of said first switching signal, said output being said second switching signal.

14. Apparatus as set forth in claim 13, further comprising means for limiting said second switching signal to be active only for a preselected time duration.

15. Apparatus for receiving information transmitted as a plurality of bits of information, each bit modulating a data carrier having a carrier frequency essentially interlaced midway between a pair of adjacent harmonics of a system-wide signal, with a pair of like-polarity pulse signals having a pulse duration T and time interval P between pulses, comprising:

means for receiving the modulated data carrier;

demodulator means for recovering the pulse-pair modulation signal from the modulated data carrier;

detector means receiving the pulse-pair modulated signal for recovering the value of the bit of information responsive to both pulses of a modulation signal; and means for synchronizing said detector means comprising clock means having an output at a clock frequency essentially equal to the reciprocal of the time interval P between pulses;

means for generating a pulse of duration T at the essentially identical point during each cycle of the output of said clock means to generate said first switching signal; and third means coupled to said demodulator means for synchronizing said clock means to cause said first switching signal to be present essentially in synchronism with each one of said pair of pulses.

16. Apparatus as set forth in claim 15, wherein said time interval P is established essentially equal to the reciprocal of the frequency of said system-wide signal; said clock means including oscillator means; means for detecting the frequency of a multiplicity of zero crossings of said system-wide signal; and means locking the frequency of said oscillator means to the frequency of said zero crossings.

17. Apparatus as set forth in claim 15, wherein said third means comprises:

means for producing pulses at a first frequency equal to the reciprocal of twice the time interval P;

means for locking said first frequency to the frequency of a synchronization code pattern transmitted immediately prior to transmission of a message containing at least one pulsepair signal; and fourth means enabling the output of said clock means only when said first frequency is locked to said synchronization frequency.

18. Apparatus as set forth in claim 17, wherein said clock means comprises oscillator means having an output frequency at an integer multiple K of said clock frequency; divider means having a reset input for generating an output signal for every K cycles of said oscillator means output frequency only after a first state is established as said reset input, the output of said divider means being disabled when a second state is established at said reset input; and said fourth means comprises means for detecting a first one of a plurality of transitions of said synchronization code pattern after said first frequency is locked thereto; and means for generating said first state at said reset input of said divider means immediately after said first transition is detected.

19. Apparatus as set forth in claim 18, further comprising means for disconnecting said third means from said demodulator means after said first state is generated; said fourth means being adapted to maintain said first state at said reset input for a substantially fixed time interval at least as long as the expected duration of a message.

20. Apparatus as set forth in claim 18, wherein an integer number M of bits of data are sequentially transmitted as a frame of modulation on said data carrier, each bit of data being transformed to an associated pulse-pair signal with each pulse having a pulse time duration T essentially equal to the quotient of the time interval P between first and second pulses of a pair and the number M of data bits per frame; said M pulse-pairs being transmitted in said frame with sequential transmission of each of the M first pulses prior to the sequential transmission of each of the M second pulses of sequentially similar ones of the pulse-pairs; said apparatus further comprising (M-1) additional detector means, each receiving the pulse-pair modulation signal from said demodulator means; said synchronizing means including means for providing each of the M detector means with first and second switching signals having proper timing for recovering each sequential one of the values of the M sequential data bits of a frame at the output means of the associated detector means; and means for sequentially coupling each detector means output means to a common detector output to obtain the recovered data bit values in proper sequential order.

21. Apparatus as set forth in claim 20, wherein the clock means output frequency is established to be M times the reciprocal of the time interval P, and further comprising counter means receiving said clock means output frequency for generating M independent sequentially and cyclically enabled outputs, each of said M outputs being the first switching signal for an associated one of the M detector means.

* * * * *